United States Patent Office 3,144,382
Patented Aug. 11, 1964

3,144,382
COPPER SULFATE - O,O - DIMETHYL - S-
(1,2 - DICARBOXYETHYL)DITHIOPHOS-
PHATE PESTICIDE
Michael Di Scala, 20 Jenny Jenks St., Norwalk, Conn.
No Drawing. Filed June 10, 1959, Ser. No. 819,212
1 Claim. (Cl. 167—16)

My invention relates to parasiticidal preparation, and relates more particularly to improved insecticides and fungicides containing as active ingredients a thiophosphate ester and a soluble copper salt. My invention also relates to compositions containing a thiophosphate ester and a soluble copper salt which in the form of solutions or dispersions are effective against a variety of insects, particularly Japanese beetles, and against fungus diseases, such as Peronospora, for example.

It is an important object of my invention to provide an improved insecticidal and fungicidal composition capable of forming sprayable solutions and dispersions which are especially effective against insects and fungus diseases.

Another object of my invention is the provision of an improved composition of a thiophosphate ester and a soluble copper salt which is especially effective in killing Japanese beetles.

Other objects and advantages of my invention will appear from the following detailed description.

As is well known mono- and polythiophosphate esters have insecticidal properties. However, when employed as the sole active ingredient in an insecticidal composition, such thiophosphate esters are not always effective. For example, when used against Japanese beetles, spraying of an aqueous solution or dispersion on the Japanese beetles merely makes them sluggish, but does not kill them. Eventually, they recover sufficiently to fly or crawl away. Copper salts are effective against certain fungus diseases such as, for example, Peronospora which attacks grapes. However, they have no effect on Japanese beetles. I have found that when a thiophosphate ester and a soluble copper salt are employed together in an aqueous solution or dispersion the copper salt has a synergistic effect on the thiophosphate ester. Thus, unlike the stunning effect of the thiophosphate ester used alone on the Japanese beetles, spraying them with the thiophosphate ester/copper salt composition kills them almost instantly. Moreover, the fungicidal properties of the components are not lost.

In accordance with my invention, I prepare my insecticidal-fungicidal composition by mixing together any mono- or polythiophosphate ester and any water-soluble copper salt in water, employing, if desired, an aromatic hydrocarbon solvent for the thiophosphate ester and a dispersing agent.

Examples of thiophosphate esters which may be employed in preparing the compositions of my invention are:

O,O-dimethyl - S - (1,2 - dicarboxyethyl)dithiophosphate (Malathion);
O,O-diethyl-O-p-nitrophenyl thiophosphate (Parathion);
O,O-dimethyl - O - p - nitrophenyl thiophosphate (Methyl Parathion); and
O,O-diethyl-O-[2-isopropyl-4 - methylpyrimid-6-yl] - thiophosphate (Diazonon).

Suitable water-soluble copper salts which may be employed in the composition of my invention are, for example: copper sulfate, copper chloride and copper nitrate.

Any suitable aromatic hydrocarbon solvent for the thiophosphate ester may be employed, examples of which are xylene and methyl naphthalene.

As dispersing agent I may use any of the nonionic or anionic surfactants. However, I have obtained highly desirable results by the use of alkyl phenyl ethers of a polyethylene glycol, particularly the nonyl phenyl ether of polyethylene glycol, a nonionic surfactant.

Since I have obtained optimum results by the use of Malathion and copper sulfate, I shall describe my invention in connection with these two toxic compounds. Thus, in preparing my improved insecticidal-fungicidal composition with the said thiophosphate ester and copper sulfate, it is generally desirable to add to one gallon of water one liquid ounce of a Malathion mixture and one liquid ounce of a copper sulfate solution. The Malathion mixture contained about 50% by weight of Malathion, about 30 to 40% by weight of an aromatic hydrocarbon solvent for the Malathion and about 10 to 20% of surfactant, i.e., dispersing or emulsifying agent. The copper sulfate solution is saturated, containing about 20% by weight of copper sulfate.

Since the copper sulfate is injurious to certain foliage if it is too concentrated, the copper sulfate should not exceed the amount of thiophosphate ester present. Preferably lower amounts should be employed, i.e., as low as 10% of the amount of the phosphate ester present in the composition.

The following example further illustrates my invention:

An aqueous emulsion is prepared containing about 0.17% by weight of copper sulfate, 0.4% by weight of O,O-dimethyl - S - (1,2 - dicarboxyethyl)dithiophosphate, 0.3% by weight of xylene and 0.1% of the nonyl phenyl ether of polyethyleneglycol.

This aqueous emulsion is sprayable and when sprayed on Japanese beetles on a bush caused them to topple from the bush and onto the ground where they were found to be dead. The aqueous emulsion caused no damage to the leaves on the bush.

It is to be understood that the foregoing detailed description is given merely by way of illustration and that many variations may be made therein without departing from the spirit of this invention.

What is desired to be secured by Letters Patent is:

An insecticidal-fungicidal composition comprising a sprayable emulsion containing about 0.17% by weight of water-soluble copper sulfate, 0.4% by weight of O,O-dimethyl-S-(1,2-dicarboxyethyl)dithiophosphate, 0.3% by weight of xylene and 0.1% of the nonyl phenyl ether of polyethyleneglycol.

References Cited in the file of this patent
UNITED STATES PATENTS
Re. 24,184    Sanders et al. _____ July 24, 1956

OTHER REFERENCES
Hanna: Handbook of Agricultural Chemicals, 2nd Ed. (1958), pp. 162, 169, 170, 301, 302, 311.